United States Patent
Onohara et al.

(10) Patent No.: US 11,606,161 B2
(45) Date of Patent: Mar. 14, 2023

(54) TRANSMISSION/RECEPTION DEVICE AND TRANSMISSION/RECEPTION METHOD

(71) Applicant: Mitsubishi Electric Corporation, Tokyo (JP)

(72) Inventors: Kiyoshi Onohara, Tokyo (JP); Tsuyoshi Yoshida, Tokyo (JP); Naoki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/590,099

(22) Filed: Feb. 1, 2022

(65) Prior Publication Data

US 2022/0158748 A1 May 19, 2022

Related U.S. Application Data

(63) Continuation of application No. PCT/JP2019/038687, filed on Oct. 1, 2019.

(51) Int. Cl.
 *H04J 14/00* (2006.01)
 *H04J 14/02* (2006.01)
 (Continued)

(52) U.S. Cl.
 CPC ........ *H04J 14/0223* (2013.01); *H04B 1/1018* (2013.01); *H04B 10/613* (2013.01); *H04B 10/64* (2013.01); *H04L 5/0007* (2013.01)

(58) Field of Classification Search
 CPC .... H04B 10/27; H04B 10/40; H04B 10/2507; H04B 10/613; H04B 10/64; H04B 10/291;
 (Continued)

(56) References Cited

U.S. PATENT DOCUMENTS

| 8,428,457 B2 * | 4/2013 | Mizutani | H04Q 11/0067 398/43 |
| 8,644,707 B2 * | 2/2014 | Gianordoli | H04B 10/29 398/67 |
| 2013/0108272 A1 * | 5/2013 | Miura | H04J 14/0278 398/72 |

FOREIGN PATENT DOCUMENTS

| JP | 2015-115762 A | 6/2015 |
| JP | 2016-158149 A | 9/2016 |

(Continued)

OTHER PUBLICATIONS

International Search Report (PCT/ISA/210) issued in PCT/JP2019/038687, dated Nov. 12, 2019.

(Continued)

*Primary Examiner* — Hanh Phan
(74) *Attorney, Agent, or Firm* — Birch, Stewart, Kolasch & Birch, LLP

(57) ABSTRACT

A transmission/reception device is configured to convert an optical signal based on a plurality of first optical signals having frequency bands different from each other into an electric signal and output the electric signal as a plurality of first electric signals; receive the plurality of first electric signals, change frequency bands of some or all of a plurality of second electric signals to narrow an interval between frequency bands of two second electric signals having frequency bands adjacent to each other, and output, as third electric signals, electric signals; to receive a plurality of the third electric signals, combine and output the plurality of third electric signals as a fourth electric signal; and receive the fourth electric signal, convert the fourth electric signal into an optical signal, and output the optical signal as a second optical signal.

8 Claims, 8 Drawing Sheets

(51) Int. Cl.
  *H04B 1/10* (2006.01)
  *H04B 10/61* (2013.01)
  *H04B 10/64* (2013.01)
  *H04L 5/00* (2006.01)

(58) Field of Classification Search
  CPC ...... H04B 10/29; H04J 14/02; H04J 14/0216; H04J 14/0245; H04J 14/0246; H04J 14/0223
  USPC ...... 398/66, 67, 68, 69, 70, 71, 72, 79, 100, 398/158, 159, 135, 136, 173, 175, 176, 398/202, 208, 177, 204, 209
  See application file for complete search history.

(56) References Cited

FOREIGN PATENT DOCUMENTS

| | | |
|---|---|---|
| JP | 2016-158169 A | 9/2016 |
| JP | 2017-135558 A | 8/2017 |
| WO | WO 2012/120645 A1 | 9/2012 |
| WO | WO 2017/029817 A1 | 2/2017 |

OTHER PUBLICATIONS

Written Opinion of the International Searching Authority (PCT/ISA/237) issued in PCT/JP2019/038687, dated Nov. 12, 2019.

\* cited by examiner

TRANSMISSION/RECEPTION DEVICE AND TRANSMISSION/RECEPTION METHOD

CROSS REFERENCE TO RELATED APPLICATION

This application is a Continuation of PCT International Application No. PCT/JP2019/038687, filed on Oct. 1, 2019, which is hereby expressly incorporated by reference into the present application.

TECHNICAL FIELD

The present invention relates to a transmission/reception device and a transmission/reception method.

BACKGROUND ART

As one of optical access systems, there is a passive optical network (PON) system.

The PON system has a connection form in which one end of one optical fiber cable (hereinafter, referred to as a "parent optical fiber") is connected to one telecommunications carrier transmission/reception device (hereinafter, referred to as an "optical line terminal (OLT)") disposed in a station building of a telecommunications carrier, the other end thereof is connected to a plurality of user transmission/reception devices (hereinafter referred to as "optical network units (ONUs)") constituting an optical access network used by a plurality of users, so that a parent optical fiber is shared by the plurality of users.

Specifically, the PON system includes an intermediate node that is a transmission/reception device having an optical passive device called a splitter between the OLT and a plurality of ONUs arranged in a house, a building, or the like in a service provision area of the telecommunications carrier. The other end of the parent optical fiber and the other ends of a plurality of optical fiber cables (hereinafter, each optical fiber is referred to as a "child optical fiber") having one ends connected to a plurality of ONUs are connected to the intermediate node. The intermediate node branches the parent optical fiber into a plurality of child optical fibers. (See, for example, Patent Literature 1.)

The PON system includes an intermediate node that enables a plurality of users to share a parent optical fiber, so that an optical access system can be implemented at a low cost.

CITATION LIST

Patent Literatures

Patent Literature 1: Japanese Patent Laid-open Publication No. 2016-158169

SUMMARY OF INVENTION

Technical Problem

In the PON system, in a link in a direction from each ONU to an OLT, when signals of different frequencies corresponding to respective ONUs are multiplexed in an intermediate node or the like by a wavelength division multiplexing (WDM) system, an orthogonal frequency division multiplexing (OFDM) system, a quadrature amplitude modulation (QAM) system, or the like, a guard band is provided between frequency bands of signals transmitted from the respective ONUs in a frequency range of signals transmitted from the respective ONUs in consideration of wavelength fluctuation of a laser or the like.

However, there is a problem that the guard band provided between the frequency bands of the signals transmitted from the plurality of ONUs reduces the frequency utilization efficiency of the frequency range used by the PON system.

The present invention is intended to solve the above-described problem, and an object thereof is to provide a transmission/reception device capable of improving frequency utilization efficiency of a frequency range used by a PON system.

Solution to Problem

A transmission/reception device according to the present invention includes: a photo-electric converter to receive an optical signal based on a plurality of first optical signals having frequency bands different from each other, convert the optical signal into an electric signal, and output the converted electric signal as a plurality of first electric signals; a guard band remover to receive a plurality of the first electric signals output from the photo-electric converter, change the frequency bands of some or all of a plurality of second electric signals that are electric signals corresponding to the respective frequency bands of a plurality of the first optical signals based on the plurality of the first electric signals to narrow an interval between the frequency bands of the two second electric signals having frequency bands adjacent to each other, and output electric signals respectively corresponding to a plurality of the second electric signals after the interval has been narrowed as a plurality of third electric signals; an electric signal combiner to receive a plurality of the third electric signals output from the guard band remover, combine the plurality of the third electric signals, and output a combined electric signal as a fourth electric signal; and an electric-photo converter to receive the fourth electric signal output from the electric signal combiner, convert the fourth electric signal into an optical signal, and output the converted optical signal as a second optical signal.

Advantageous Effects of Invention

According to the present invention, the frequency utilization efficiency of the frequency range used by the PON system can be improved.

DESCRIPTION OF EMBODIMENTS

Hereinafter, embodiments of the present invention will be described in detail with reference to the drawings.

First Embodiment

A transmission/reception device 100 according to a first embodiment will be described with reference to FIGS. 1 to 4.

A configuration of a main part of a PON system 1 to which the transmission/reception device 100 according to the first embodiment is applied will be described with reference to FIG. 1.

Figure 1:
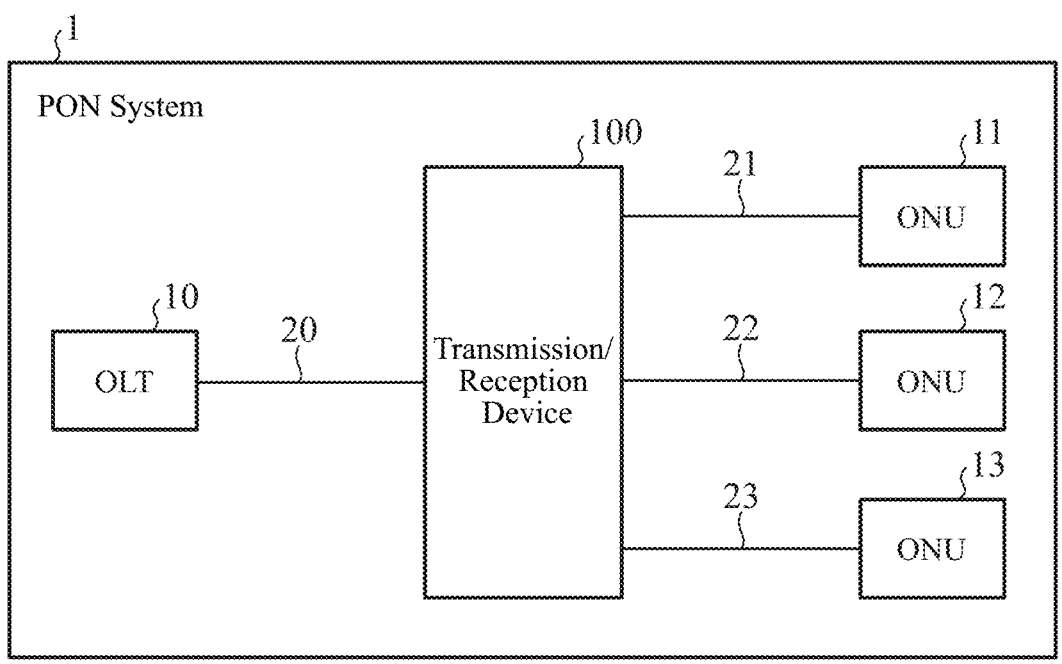
FIG. 1 is a diagram illustrating an example of a configuration of a main part of a PON system to which a transmission/reception device according to a first embodiment is applied.

FIG. 1 is a diagram illustrating an example of a configuration of a main part of the PON system 1 to which the transmission/reception device 100 according to the first embodiment is applied.

The PON system 1 includes an OLT 10, a plurality of ONUs 11, 12, and 13, the transmission/reception device 100, a first optical communication path 20, and a plurality of second optical communication paths 21, 22, and 23.

The OLT 10 is a transmission/reception device for a telecommunications carrier disposed in a station building of a telecommunications carrier.

Each of the ONUs 11, 12, and 13 is a user transmission/reception device disposed in a house, a building, or the like in a service provision area of the telecommunications carrier.

As an example, the PON system 1 according to the first embodiment will be described as including three ONUs 11, 12, and 13 as the plurality of ONUs 11, 12, and 13 as illustrated in FIG. 1. However, the number of ONUs 11, 12, and 13 included in the PON system 1 may be equal to or more than two, and may be two or equal to or more than four.

Each of the first optical communication path 20 and the second optical communication paths 21, 22, and 23 is a communication path including an optical fiber cable or the like for transmitting an optical signal.

The first optical communication path 20 has one end connected to the OLT 10 and the other end connected to the transmission/reception device 100.

Each of the plurality of second optical communication paths 21, 22, and 23 has one end connected to the corresponding ONUs 11, 12, and 13, and the other end connected to the transmission/reception device 100.

Since the PON system 1 according to the first embodiment includes three ONUs 11, 12, and 13, the PON system 1 includes three second optical communication paths 21, 22, and 23 as the plurality of second optical communication paths 21, 22, and 23. The number of the second optical communication paths 21, 22, and 23 included in the PON system 1 is a number corresponding to the number of ONUs 11, 12, and 13 in the PON system 1.

The transmission/reception device 100 functions as an intermediate node in the PON system 1.

The transmission/reception device 100 receives optical signals output from the plurality of ONUs 11, 12, and 13 as first optical signals through the second optical communication paths 21, 22, and 23 respectively corresponding to the plurality of ONUs 11, 12, and 13, thereby receiving the plurality of first optical signals. In addition, the transmission/reception device 100 combines signals based on the plurality of first optical signals received by the transmission/reception device 100, and transmits an optical signal based on the combined signal as a second optical signal to the OLT 10 through the first optical communication path 20.

The plurality of ONUs 11, 12, and 13 each outputs optical signals having frequency bands different from each other. Thus, the transmission/reception device 100 receives a plurality of first optical signals having frequency bands different from each other.

Note that the transmission/reception device 100 illustrated in FIG. 1 receives three first optical signals because there are three ONUs 11, 12, and 13 connected to the transmission/reception device 100. The three first optical signals received by the transmission/reception device 100 illustrated in FIG. 1 are optical signals having frequency bands different from each other of the three first optical signals. The transmission/reception device 100 illustrated in FIG. 1 combines signals based on three first optical signals having frequency bands different from each other received by the transmission/reception device 100, and transmits an optical signal based on the combined signal as a second optical signal to the OLT 10 through the first optical communication path 20.

A configuration of a main part of the transmission/reception device 100 according to the first embodiment will be described with reference to FIG. 2.

Figure 2:
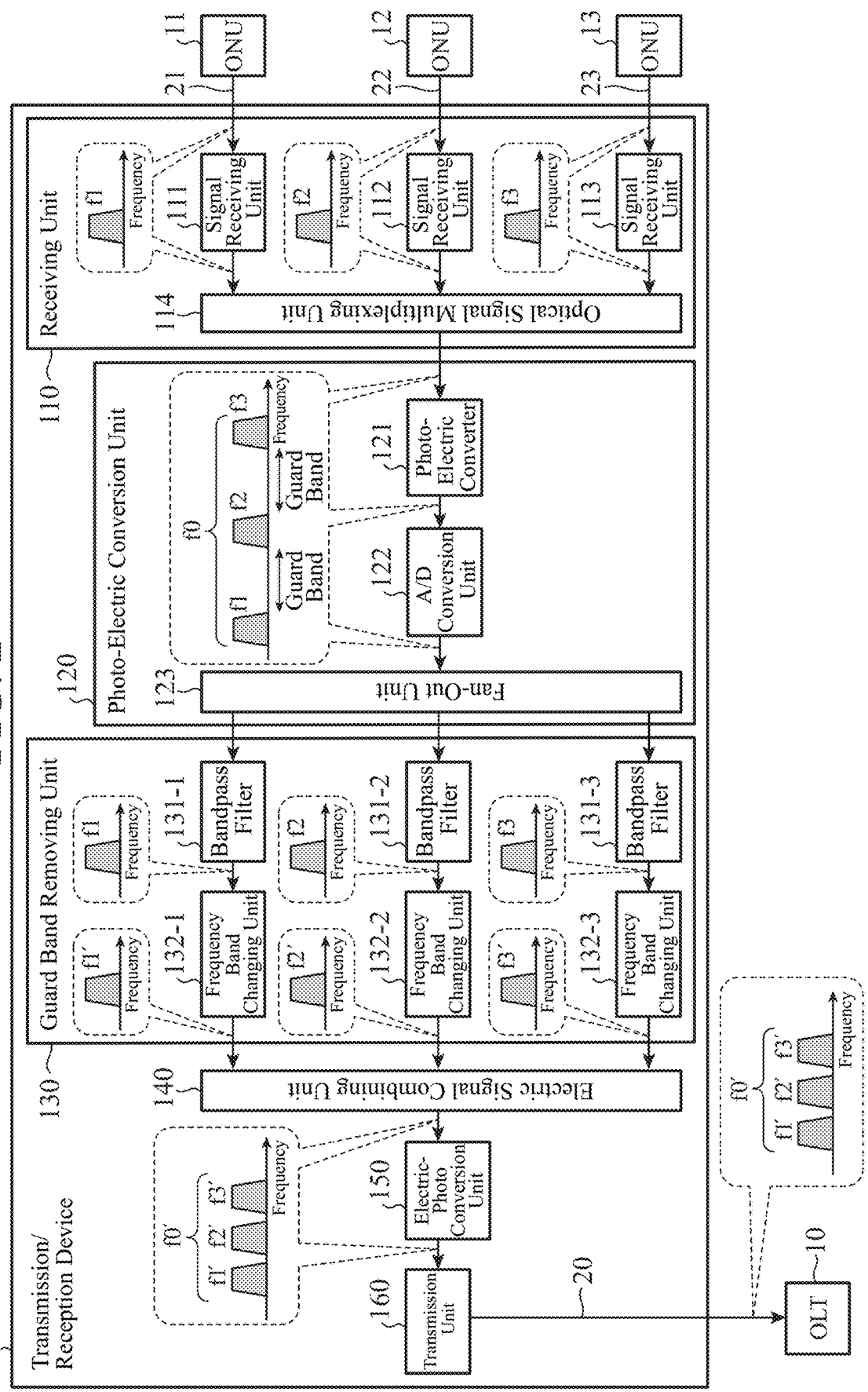
FIG. 2 is a diagram illustrating an example of a configuration of a main part of the transmission/reception device according to the first embodiment.

FIG. 2 is a diagram illustrating an example of a configuration of a main part of the transmission/reception device 100 according to the first embodiment.

The transmission/reception device 100 includes a receiving unit 110, a photo-electric conversion unit 120, a guard band removing unit 130, an electric signal combining unit 140, an electric-photo conversion unit 150, and a transmission unit 160.

The receiving unit 110 receives a plurality of first optical signals by receiving, as first optical signals, optical signals having frequency bands different from each other output from each of the plurality of ONUs 11, 12, and 13. The receiving unit 110 outputs an optical signal based on the plurality of received first optical signals to the photo-electric conversion unit 120.

Specifically, for example, the receiving unit 110 illustrated in FIG. 2 includes three signal receiving units 111, 112, and 113 corresponding to the number of ONUs 11, 12, and 13 connected to the transmission/reception device 100, that is, the number of first optical signals received by the transmission/reception device 100, and an optical signal multiplexing unit 114.

The three signal receiving units 111, 112, and 113 are connected to the other ends of the corresponding second optical communication paths 21, 22, and 23, respectively. The three signal receiving units 111, 112, and 113 are connected to the corresponding ONUs 11, 12, and 13 through the connected second optical communication paths 21, 22, and 23, respectively.

The three signal receiving units 111, 112, and 113 receive optical signals output from the corresponding ONUs 11, 12, and 13 as first optical signals through the connected second optical communication paths 21, 22, and 23, respectively. Specifically, the three signal receiving units 111, 112, and 113 each receive one of first optical signals having frequency bands different from each other. More specifically, for example, the signal receiving unit 111 receives an optical signal output from the ONU 11 and having a frequency band of f1 as the first optical signal through the second optical communication path 21. In addition, the signal receiving unit 112 receives an optical signal output from the ONU 12 and having a frequency band of f2 as the first optical signal through the second optical communication path 22. f1 and f2 have different frequency bands, and a guard band is provided between f1 and f2. In addition, the signal receiving unit 113 receives an optical signal output from the ONU 13 and having a frequency band of f3 as the first optical signal through the second optical communication path 23. f1, f2, and f3 have different frequency bands, and a guard band is provided between f2 and f3. Note that, in the above description, it is assumed that f1, f2, and f3 satisfy f1<f2<f3 as an example.

Each of the three signal receiving units 111, 112, and 113 outputs the received first optical signal to the optical signal multiplexing unit 114.

The optical signal multiplexing unit 114 includes an optical coupler or the like. More specifically, for example, the optical signal multiplexing unit 114 is configured by combining a plurality of 1×2 optical couplers.

The optical signal multiplexing unit 114 receives a plurality of first optical signals having frequency bands different from each other by receiving the first optical signals output from each of the plurality of signal receiving units 111, 112, and 113. The optical signal multiplexing unit 114 multiplexes the plurality of first optical signals received by the optical signal multiplexing unit 114, and outputs the multiplexed optical signal to the photo-electric conversion unit 120 as a third optical signal.

That is, in the first embodiment, the optical signal based on the three first optical signals output from the receiving unit 110 is the third optical signal output from the optical signal multiplexing unit 114.

The optical signal multiplexing unit 114 illustrated in FIG. 2 receives three first optical signals having frequency bands different from each other output from the three signal receiving units 111, 112, and 113, multiplexes the three first optical signals, and outputs the multiplexed optical signal to the photo-electric conversion unit 120 as a third optical signal.

As illustrated in FIG. 2, the third optical signal output from the optical signal multiplexing unit 114 illustrated in FIG. 2 is an optical signal having signals at f1, f2, and f3 having frequency bands different from each other. As illustrated in FIG. 2, in the third optical signal, the guard bands are provided both between f1 and f2 and between f2 and f3. A frequency range including all frequency bands of f1, f2, and f3 having frequency bands different from each other in the third optical signal is defined as f0.

The photo-electric conversion unit 120 receives an optical signal based on a plurality of first optical signals having frequency bands different from each other output from the receiving unit 110, that is, a third optical signal, and converts the third optical signal into an electric signal. The photo-electric conversion unit 120 outputs the converted electric signal to the guard band removing unit 130 as a plurality of first electric signals corresponding to the number of first optical signals received by the transmission/reception device 100.

In FIG. 2, since the number of first optical signals received by the transmission/reception device 100 is three, the photo-electric conversion unit 120 illustrated in FIG. 2 outputs the three first electric signals to the guard band removing unit 130.

Specifically, for example, the photo-electric conversion unit 120 according to the first embodiment includes a photo-electric converter 121, an A/D conversion unit 122, and a fan-out unit 123.

The photo-electric converter 121 receives the third optical signal output from the receiving unit 110, converts the third optical signal into an analog electric signal, and outputs the converted analog electric signal to the A/D conversion unit 122.

Specifically, for example, the photo-electric converter 121 includes a photodetector. In a case where the photo-electric converter 121 includes a photodetector, the photo-electric converter 121 converts an optical signal based on the plurality of first optical signals into an electric signal by photo-electric conversion by an intensity modulation and direct detection system. When the photo-electric converter 121 performs photo-electric conversion by the intensity modulation and direct detection system, the transmission/reception device 100 can transmit a WDM signal or the like modulated by the WDM system.

Furthermore, for example, the photo-electric converter 121 may include a photoelectric element of a coherent detection system. In a case where the photo-electric converter 121 includes a photoelectric element of a coherent detection system, the transmission/reception device 100 can transmit an OFDM signal modulated by an OFDM system, a QAM signal modulated by a QAM system, or the like.

The A/D conversion unit 122 includes an A/D converter including an A/D conversion circuit and the like.

The A/D conversion unit 122 receives the analog electric signal output from the photo-electric converter 121, converts the analog electric signal into a digital electric signal, and outputs the converted digital electric signal to the fan-out unit 123.

The fan-out unit 123 receives an electric signal obtained after the photo-electric conversion unit 120 converts the third optical signal, which is an optical signal based on a plurality of first optical signals having frequency bands different from each other output from the receiving unit 110, into an electric signal. The fan-out unit 123 divides the electric signal into a number of electric signals corresponding to the number of first optical signals received by the transmission/reception device 100, and outputs the electric signals. Specifically, for example, the fan-out unit 123 receives the digital electric signal output from the A/D conversion unit 122, duplicates the digital electric signal to divide the digital electric signal into a plurality of digital electric signals, and outputs the plurality of digital electric signals.

More specifically, for example, the fan-out unit 123 illustrated in FIG. 2 divides the digital electric signal output from the A/D conversion unit 122 into three electric signals corresponding to the number of ONUs 11, 12, and 13 connected to the transmission/reception device 100, that is, the number of first optical signals received by the transmission/reception device 100, and outputs the three electric signals.

The photo-electric conversion unit 120 outputs the plurality of electric signals output from the fan-out unit 123 as a plurality of first electric signals.

Specifically, for example, the photo-electric conversion unit 120 illustrated in FIG. 2 outputs the three electric signals output from the fan-out unit 123 to the guard band removing unit 130 as the three first electric signals.

As illustrated in FIG. 2, each of the three first electric signals output from the photo-electric conversion unit 120 is an electric signal including all signals with frequency bands of f1, f2, and f3 having frequency bands different from each other.

The guard band removing unit 130 receives the plurality of first electric signals output from the photo-electric converter 121. The guard band removing unit 130 changes the frequency bands of some or all of the plurality of second electric signals that are electric signals corresponding to the respective frequency bands of the plurality of first optical signals based on the plurality of first electric signals. The guard band removing unit 130 changes the frequency bands of some or all of the plurality of second electric signals to narrow the interval between the frequency bands of the two second electric signals having frequency bands adjacent to each other. The guard band removing unit 130 outputs the electric signals, each of which corresponds to each of the plurality of second electric signals after the interval is narrowed to the electric signal combining unit 140, as the plurality of third electric signals.

Specifically, for example, the guard band removing unit 130 illustrated in FIG. 2 receives three first electric signals corresponding to the number of first optical signals received by the transmission/reception device 100. The guard band removing unit 130 illustrated in FIG. 2 changes frequency bands of some or all of the three second electric signals that are electric signals corresponding to the respective frequency bands of the three first optical signals based on the three first electric signals. The guard band removing unit 130 illustrated in FIG. 2 changes the frequency bands of some or all of the three second electric signals to narrow the interval between the frequency bands of the two second electric signals having frequency bands adjacent to each other. The guard band removing unit 130 illustrated in FIG. 2 outputs electric signals, each of which corresponds to one of the three second electric signals after the interval is narrowed to the electric signal combining unit 140, as three third electric signals.

More specifically, for example, the guard band removing unit 130 according to the first embodiment includes three bandpass filters 131-1, 131-2, and 131-3 and three frequency band changing units 132-1, 132-2, and 132-3 each corresponding to the number of first optical signals received by the transmission/reception device 100.

Each of the three bandpass filters 131-1, 131-2, and 131-3 receives one of the three first electric signals received by the guard band removing unit 130. Each of the three bandpass filters 131-1, 131-2, and 131-3 cuts out an electric signal having a corresponding frequency band among the respective frequency bands of the three first optical signals having frequency bands different from each other from the first electric signal, and outputs the cut out electric signal as a second electric signal.

As illustrated in FIG. 2, each of the second electric signals output from the respective three bandpass filters 131-1, 131-2, and 131-3 is an electric signal having one frequency band corresponding to each of the bandpass filters 131-1, 131-2, and 131-3 among f1, f2, or f3 having frequency bands different from each other.

Each of the three frequency band changing units 132-1, 132-2, and 132-3 receives the second electric signal output from the corresponding bandpass filter 131-1, 131-2, or 131-3. In the three frequency band changing units 132-1, 132-2, and 132-3, some or all of the three frequency band changing units 132-1, 132-2, and 132-3 change the frequency bands of the second electric signals received by the respective frequency band changing units 132-1, 132-2, and 132-3, thereby narrowing the interval between the frequency bands of the two second electric signals having frequency bands adjacent to each other. Each of the three frequency band changing units 132-1, 132-2, and 132-3 outputs an electric signal corresponding to the second electric signal after the interval is narrowed as the third electric signal.

The guard band removing unit 130 illustrated in FIG. 2 outputs the third electric signals, each of which is output from one of the three frequency band changing units 132-1, 132-2, and 132-3, to the electric signal combining unit 140, thereby outputting the three third electric signals to the electric signal combining unit 140.

Specifically, for example, as illustrated in FIG. 2, each of the three third electric signals output from the guard band removing unit 130 is an electric signal having one frequency band among f1', f2', or f3' having frequency bands different from each other.

Note that, in the guard band removing unit 130 illustrated in FIG. 2, each of the three frequency band changing units 132-1, 132-2, and 132-3 changes the frequency band of the second electric signal received by each of the frequency band changing units 132-1, 132-2, and 132-3, but the present invention is not limited thereto. In the guard band removing unit 130, for example, one of the three frequency band changing units 132-1, 132-2, and 132-3 may output, as a third electric signal, the second electric signal without changing the frequency band, and each of the frequency band changing units other than the relevant frequency band changing unit may output, as the third electric signal, the electric signal corresponding to the second electric signal after narrowing the interval between the frequency bands of the two second electric signals having frequency bands adjacent to each other by changing the frequency band of the second electric signal with reference to the frequency band of the relevant third electric signal.

The electric signal combining unit 140 includes, for example, an adder circuit.

The electric signal combining unit 140 receives a plurality of third electric signals output from the guard band removing unit 130, combines the plurality of third electric signals, and outputs the combined electric signal to the electric-photo conversion unit 150 as a fourth electric signal.

The electric signal combining unit 140 illustrated in FIG. 2 receives three third electric signals output from the guard band removing unit 130 and having any one of signals f1', f2', and f3' having frequency bands different from each other, and combines the three third electric signals. Thus, as illustrated in FIG. 2, the fourth electric signal output from the electric signal combining unit 140 is an electric signal including all signals with frequency bands of f1', f2', and f3' having frequency bands different from each other.

The electric-photo conversion unit 150 includes a photo-electric conversion element or the like.

The electric-photo conversion unit 150 receives the fourth electric signal output from the electric signal combining unit 140, converts the fourth electric signal into an optical signal, and outputs the converted optical signal to the transmission unit 160 as a second optical signal.

The electric-photo conversion unit 150 converts the fourth electric signal into the second optical signal by a modulation system such as a WDM system, an OFDM system, or a QAM system. Note that the modulation system in the electric-photo conversion unit 150 is determined in advance depending on the configuration of the photo-electric converter 121 in the photo-electric conversion unit 120.

As illustrated in FIG. 2, the second optical signal output from the electric-photo conversion unit 150 is an optical signal including all signals with frequency bands of f1', f2', and f3' having frequency bands different from each other.

A frequency range including all frequency bands f1', f2', and f3' having frequency bands different from each other in the second optical signal output from the electric-photo conversion unit 150 is defined as f0'.

The transmission unit 160 receives the second optical signal output from the electric-photo conversion unit 150, and transmits the second optical signal to the OLT 10 through the first optical communication path 20.

With the above configuration, the transmission/reception device 100 can compress some or all of the guard bands provided between the first optical signals by narrowing the interval between any first optical signals having frequency bands adjacent to each other among the first optical signals having frequency bands different from each other. Specifically, for example, the transmission/reception device 100 can output, to the OLT 10, the second optical signal whose frequency range f0' is smaller in frequency bandwidth than f0, which is the frequency range of the third optical signal. That is, the transmission/reception device 100 can improve the frequency utilization efficiency of the frequency range used by the PON system 1 by compressing some or all of the guard bands provided between the first optical signals.

Figure 3:
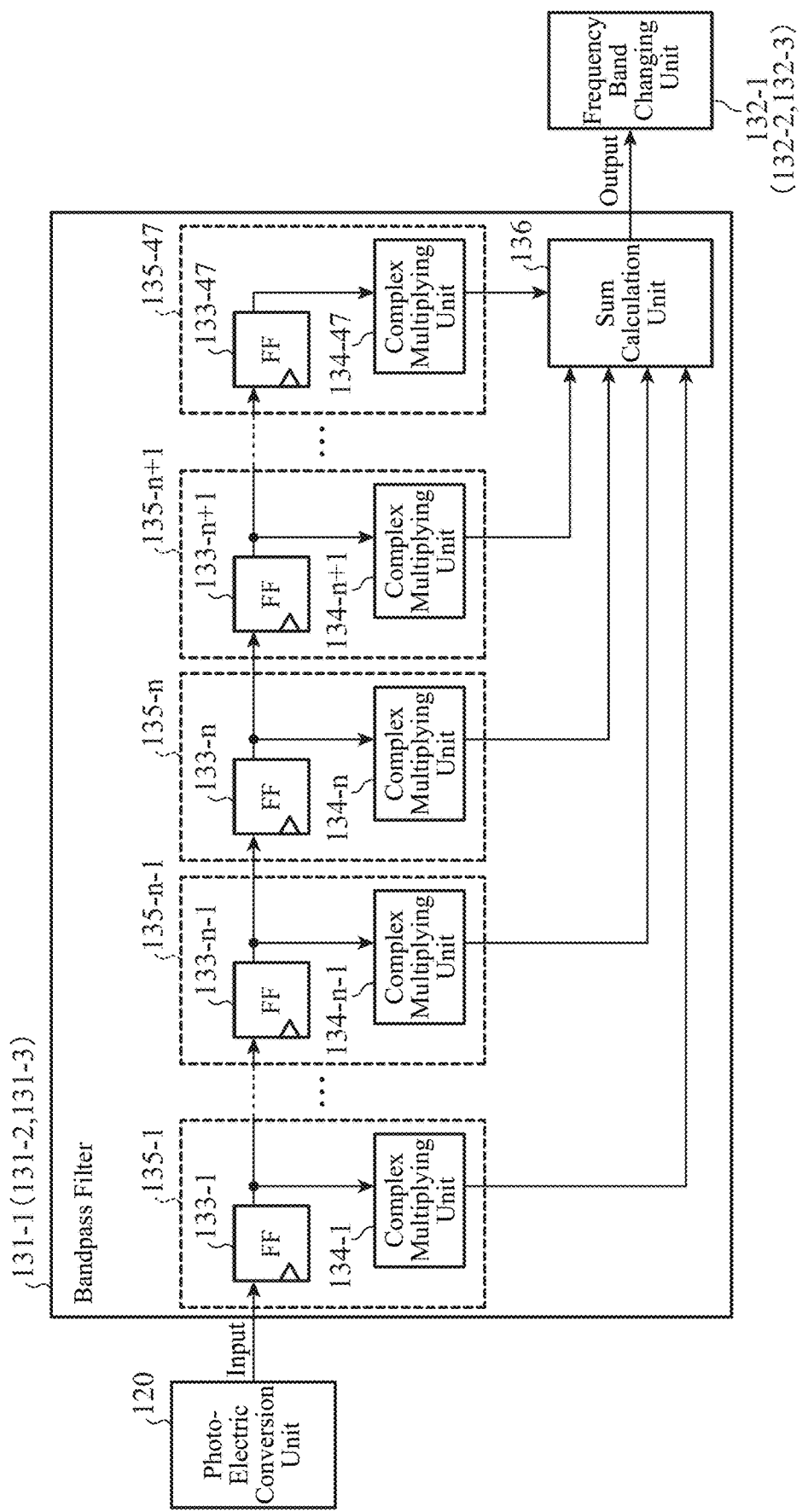
FIG. 3 is a block diagram illustrating an example of a configuration of a main part of a bandpass filter included in a guard band removing unit according to the first embodiment.

With reference to FIG. 3, a configuration of a main part of the bandpass filter 131-1, 131-2, 131-3 included in the guard band removing unit 130 according to the first embodiment will be described.

FIG. 3 is a block diagram illustrating an example of a configuration of a main part of the bandpass filter 131-1, 131-2, 131-3 included in the guard band removing unit 130 according to the first embodiment.

Each bandpass filter 131-1, 131-2, 131-3 includes a plurality of flip-flops 133-1, . . . , and 133-47, a plurality of complex multiplication units 134-1, . . . , and 134-47, and a sum calculation unit 136.

Each bandpass filter 131-1, 131-2, 131-3 illustrated in FIG. 3 includes, as an example, 47 flip-flops 133-1, . . . , and 133-47, 47 complex multiplication units 134-1, . . . , and 134-47, and one sum calculation unit 136.

One flip-flop 133-$n$ ($n$ is any natural number from 1 to 47) and one complex multiplication unit 134-$n$ corresponding to the flip-flop 133-$n$ constitute a 1-tap digital filter 135-$n$. That is, 47 flip-flops 133-1, . . . , and 133-47 and 47 complex multiplication units 134-1, . . . , and 134-47 constitute a 47-tap digital filter 135-1, . . . , 135-47. The number of taps of the digital filter 135-1, . . . , 135-47, that is, the number of the flip-flops 133-1, . . . , and 133-47 and the complex multiplication units 134-1, . . . , and 134-47 is determined by desired filter performance, a desired circuit scale, or the like. Therefore, the number of taps is not limited to 47 as long as the filter performance, the circuit scale, or the like in each bandpass filter 131-1, 131-2, 131-3 satisfies a desired condition.

The first electric signal received by each bandpass filter 131-1, 131-2, 131-3 is sequentially branched by each of the 47 flip-flops 133-1, . . . , and 133-47.

The signal sequentially branched in each of the 47 flip-flops 133-1, . . . , and 133-47 is multiplied by a predetermined coefficient in the complex multiplication units 134-1, . . . , and 133-47 corresponding to the 47 flip-flops 133-1, . . . , and 134-47, respectively.

All the signals multiplied by predetermined coefficients in each of the complex multiplication units 134-1, . . . , and 134-47 are added in the sum calculation unit 136, and the added signal is output as the second electric signal.

A configuration of a main part of the frequency band changing unit 132-1, 132-2, 132-3 included in the guard band removing unit 130 according to the first embodiment will be described with reference to FIG. 4.

Figure 4:
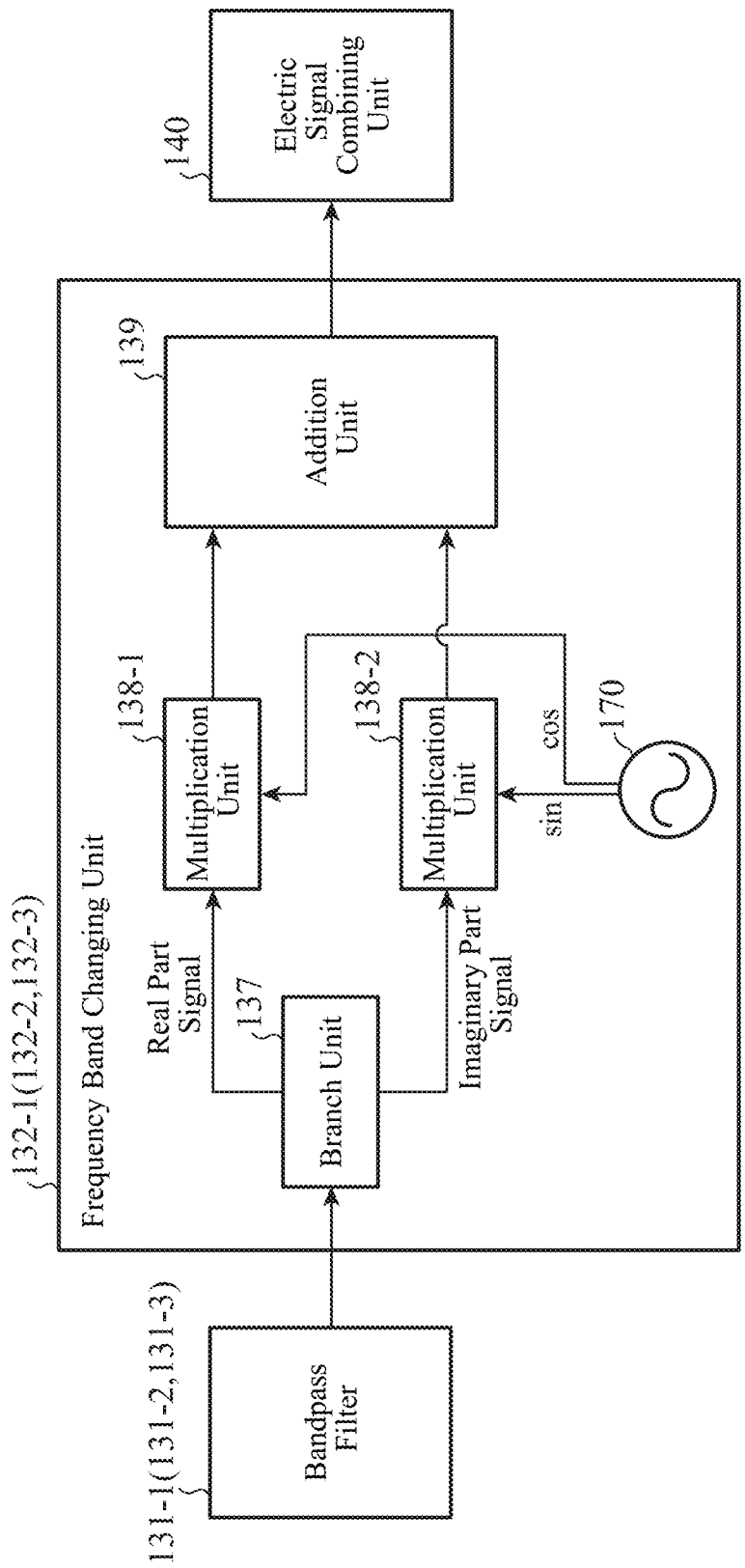
FIG. 4 is a block diagram illustrating an example of a configuration of a main part of a frequency band changing unit included in the guard band removing unit according to the first embodiment.

FIG. 4 is a block diagram illustrating an example of a configuration of a main part of the frequency band changing unit 132-1, 132-2, 132-3 included in the guard band removing unit 130 according to the first embodiment.

Each frequency band changing unit 132-1, 132-2, 132-3 includes a branch unit 137, multiplication units 138-1, and 138-2, an addition unit 139, and a numerical controlled oscillator (NCO) 170.

The branch unit 137 branches the second electric signal received by each frequency band changing unit 132-1, 132-2, 132-3 into two signals of a real part signal that is a signal of a real part and an imaginary part signal that is a signal of an imaginary part.

The multiplication unit 138-1 multiplies the real part signal of the two branched signals branched by the branch unit 137 by a cosine component.

The multiplication unit 138-2 multiplies the imaginary part signal of the two branched signals branched by the branch unit 137 by a sine component.

The addition unit 139 adds a signal obtained after the multiplication unit 138-1 multiplies the real part signal by the cosine component and a signal obtained after the multiplication unit 138-2 multiplies the imaginary part signal by the sine component, and outputs the added signal as a third electric signal.

The second electric signal will be described as a signal having a frequency of fp.

The second electric signal having a frequency fp is expressed by the following Expression (1) by the Euler's formula.

$$e^{i2\pi fpt}=\cos(2\pi fpt)+j\sin(2\pi fpt) \quad \text{Expression (1)}$$

Here, j is an imaginary unit, and t is a time variable.

The multiplication unit 138-1 multiplies cos (2πfpt) representing the real part signal of the second electric signal by the real part signal cos (2πfqt) of the signal having the frequency fq, and the multiplication unit 138-2 multiplies j sin (2πfpt) representing the imaginary part signal of the second electric signal by the imaginary part signal j sin (2πfqt) of the signal having the frequency fq, whereby the second electric signal expressed by the Expression (1) is deformed as in the following Expression (2).

$$e^{i2\pi fpt} \times e^{i2\pi fqt} = e^{i2\pi (fp+fq)t} \quad \text{Expression (2)}$$
$$= \cos\{2\pi\,(fp+fq)t\} +$$
$$j\sin\{2\pi\,(fp+fq)t\}$$

That is, the multiplication unit 138-1 multiplies the real part signal by the real part signal cos (2πfqt) of the signal having the frequency fq, and the multiplication unit 138-2 multiplies the imaginary part signal by the imaginary part signal j sin (2πfqt) of the signal having the frequency fq, whereby the frequency of the second electric signal is converted from fp to fp+fq. That is, the frequency of the second electric signal is shifted by fq.

The NCO 170 refers to a numerical table in which a shift amount for the frequency-shifting of the second electric signal is stored in advance, and whereby outputs, for each clock, a value of a cosine component by which the multiplication unit 138-1 multiplies the real part signal of the second electric signal and a value of a sine component by which the multiplication unit 138-2 multiplies the imaginary part signal of the second electric signal.

The multiplication unit 138-1 multiplies the real part signal of the second electric signal by the value of the cosine component output from the NCO 170 for each clock. In addition, the multiplication unit 138-2 multiplies the imaginary part signal of the second electric signal by the value of the sine component output from the NCO 170 for each clock.

As described above, each of the frequency band changing units 132-1, 132-2, and 132-3 shifts the frequency of the second electric signal received by each of the frequency band changing units 132-1, 132-2, and 132-3 by the predetermined frequency, and whereby the guard band removing unit 130 can narrow the interval between the frequency bands of the two second electric signals having frequency bands adjacent to each other.

As described above, the transmission/reception device 100 includes: the photo-electric conversion unit 120 to receive an optical signal based on a plurality of first optical signals having frequency bands different from each other, convert the optical signal into an electric signal, and outputs the converted electric signal as a plurality of first electric signals; the guard band removing unit 130 to receive the plurality of first electric signals output from the photo-electric conversion unit 120, change the frequency bands of some or all of a plurality of second electric signals that are electric signals corresponding to the respective frequency bands of the plurality of first optical signals based on the plurality of first electric signals to narrow an interval between the frequency bands of the two second electric signals having frequency bands adjacent to each other, and output electric signals, each of which corresponds to each of the plurality of second electric signals after the interval has been narrowed as a plurality of third electric signals; the electric signal combining unit 140 to receive the plurality of third electric signals output from the guard band removing unit 130, combine the plurality of third electric signals, and output a combined electric signal as a fourth electric signal; and the electric-photo conversion unit 150 to receive the fourth electric signal output from the electric signal combining unit 140, convert the fourth electric signal into an optical signal, and output the converted optical signal as a second optical signal.

With this configuration, the transmission/reception device 100 can improve the frequency utilization efficiency of the frequency range used by the PON system 1.

For example, the transmission/reception device 100 can be applied as an intermediate node in a passive optical network (PON) system used in an optical access system such as a fifth generation mobile communication system (hereinafter referred to as "5G").

Standardization of 5G in Phase 1 was completed in 2018 by Third Generation Partnership Project (3GPP), which is an international standardization organization. In 5G, use of a millimeter wave band suitable for broadband ultra-high speed communication in addition to a frequency band close to a frequency range used in a conventional fourth generation mobile communication system (hereinafter referred to as "4G") has been studied.

In communication using a high frequency band that is a millimeter wave band, a communication distance from a radio base station to a terminal used by a user is shorter than that in communication using a microwave band. Therefore, in order to achieve stable high-speed communication, large-capacity communication, or the like using the millimeter wave band, 5G is required to arrange an enormous number of radio base stations at high density as compared with 4G.

When an enormous number of radio base stations are arranged by the PON system, it is necessary to arrange an intermediate node for each predetermined number of ONUs. Since the transmission/reception device 100 can improve the frequency utilization efficiency of the frequency range used by the PON system 1, the PON system 1 using the transmission/reception device 100 as an intermediate node can reduce the number of intermediate nodes in the PON system 1.

Further, in the above-described configuration, the transmission/reception device 100 is configured so that the photo-electric conversion unit 120 includes the A/D conversion unit 122 capable of converting an analog electric signal having the frequency bands corresponding to all of a plurality of first optical signals into a digital electric signal, the photo-electric conversion unit 120 outputs an electric signal converted into the digital electric signal by the A/D conversion unit 122 as the plurality of first electric signals, and the guard band removing unit 130 receives the plurality of first electric signals, which are all digital electric signals, and performs digital signal processing on the plurality of first electric signals to change the frequency bands of some or all of the plurality of second electric signals based on the plurality of first electric signals.

With this configuration, the transmission/reception device 100 can improve the frequency utilization efficiency of the frequency range used by the PON system 1.

Further, in the above-described configuration, the transmission/reception device 100 includes the optical signal multiplexing unit 114 to receive a plurality of the first optical signals, multiplex the plurality of the first optical signals, and output a multiplexed optical signal as a third optical signal, and is configured so that the photo-electric conversion unit 120 receives the third optical signal output from the optical signal multiplexing unit 114 as an optical signal based on a plurality of the first optical signals, the photo-electric conversion unit 120 includes the fan-out unit 123, the fan-out unit 123 receives an electric signal after the third optical signal is converted into an electric signal by the photo-electric conversion unit 120, divides the electric signal into a plurality of electric signals, and outputs the plurality of electric signals, the photo-electric conversion unit 120 outputs the plurality of electric signals output from the fan-out unit 123 as a plurality of the first electric signals, the guard band removing unit 130 includes a plurality of bandpass filters 131-1, 131-2, and 131-3, each of a plurality of the bandpass filters 131-1, 131-2, and 131-3 receives one of a plurality of the first electric signals received by the guard band removing unit 130, cuts out an electric signal having the corresponding frequency band among the respective frequency bands of a plurality of the first optical signals from the first electric signal, and outputs the cut out electric signal as the second electric signal, and the guard band removing unit 130 changes the frequency bands of some or all of the second electric signals, each of which is output from one of a plurality of the bandpass filters 131-1, 131-2, and 131-3 to narrow an interval between the frequency bands of the two second electric signals having frequency bands adjacent to each other, and outputs electric signals corresponding to each of a plurality of the second electric signals after the interval has been narrowed as a plurality of the third electric signals.

With this configuration, the transmission/reception device 100 can improve the frequency utilization efficiency of the frequency range used by the PON system 1.

Further, in the above configuration, the transmission/reception device 100 is configured so that the second optical signal output from the electric-photo conversion unit 150 is an optical signal modulated by the WDM system.

With this configuration, the transmission/reception device 100 can improve the frequency utilization efficiency of the frequency range used by the PON system 1.

Further, in the above configuration, the transmission/reception device 100 is configured so that the second optical signal output from the electric-photo conversion unit 150 is an optical signal modulated by the OFDM system.

With this configuration, the transmission/reception device 100 can improve the frequency utilization efficiency of the frequency range used by the PON system 1.

Furthermore, in the transmission/reception device 100, in the above-described configuration, the photo-electric conversion unit 120 is configured to convert the optical signal based on the plurality of first optical signals into the electric signal by photo-electric conversion by the intensity modulation and direct detection system.

With this configuration, the transmission/reception device 100 can improve the frequency utilization efficiency of the frequency range used by the PON system 1.

Furthermore, in the transmission/reception device 100, in the above-described configuration, the photo-electric conversion unit 120 is configured to convert the optical signal based on the plurality of first optical signals into the electric signal by photo-electric conversion by the coherent detection system.

With this configuration, the transmission/reception device 100 can improve the frequency utilization efficiency of the frequency range used by the PON system 1.

Second Embodiment

A transmission/reception device 100*a* according to a second embodiment will be described with reference to FIGS. 5 and 6.

Figure 5:
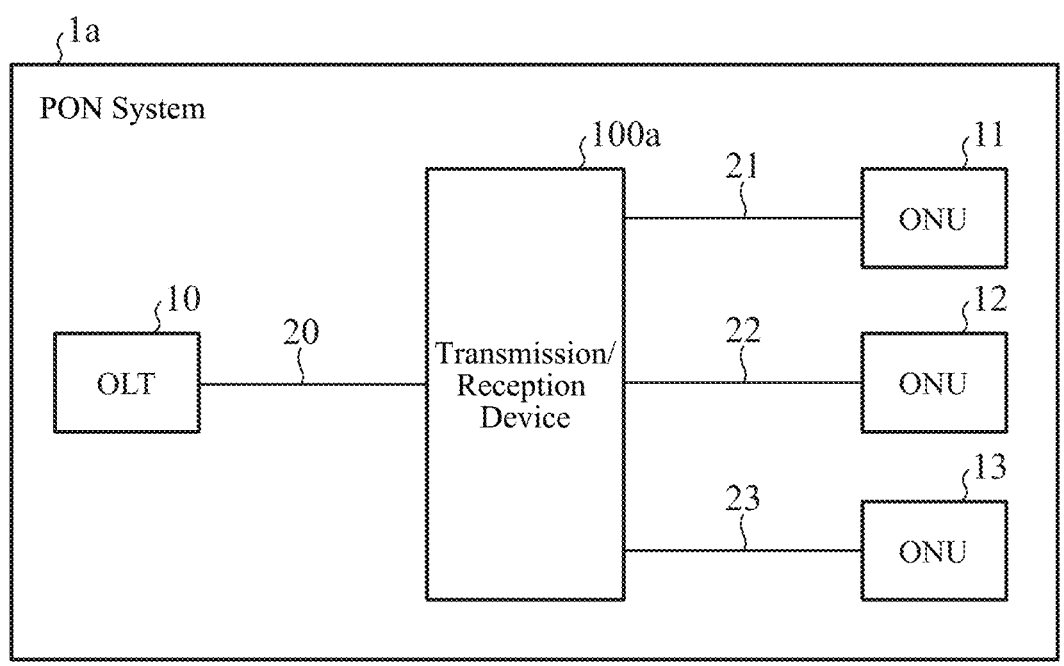
FIG. 5 is a diagram illustrating an example of a configuration of a main part of a PON system to which a transmission/reception device according to a second embodiment is applied.

FIG. 5 is a diagram illustrating an example of a configuration of a main part of a PON system 1*a* to which the transmission/reception device 100*a* according to the second embodiment is applied.

The PON system 1*a* includes an OLT 10, a plurality of ONUs 11, 12, and 13, a transmission/reception device 100*a*, a first optical communication path 20, and a plurality of second optical communication paths 21, 22, and 23.

By referring to FIG. 5, a configuration of the PON system 1*a* to which the transmission/reception device 100*a* according to the second embodiment is applied will be described. Note that, in FIG. 5, the same reference numerals are given to the same configurations as those illustrated in FIG. 1, and the description thereof will be omitted.

Hereinafter, as illustrated in FIG. 5, the PON system 1*a* will be described as including three ONUs 11, 12, and 13 and three second optical communication paths 21, 22, and 23 corresponding to the number of ONUs 11, 12, and 13.

In the PON system 1*a*, the transmission/reception device 100 according to the first embodiment is changed to the transmission/reception device 100*a*. Therefore, description of the OLT 10, the three ONUs 11, 12, and 13, the first optical communication path 20, and the second optical communication paths 21, 22, and 23 included in the PON system 1*a* will be omitted.

Figure 6:
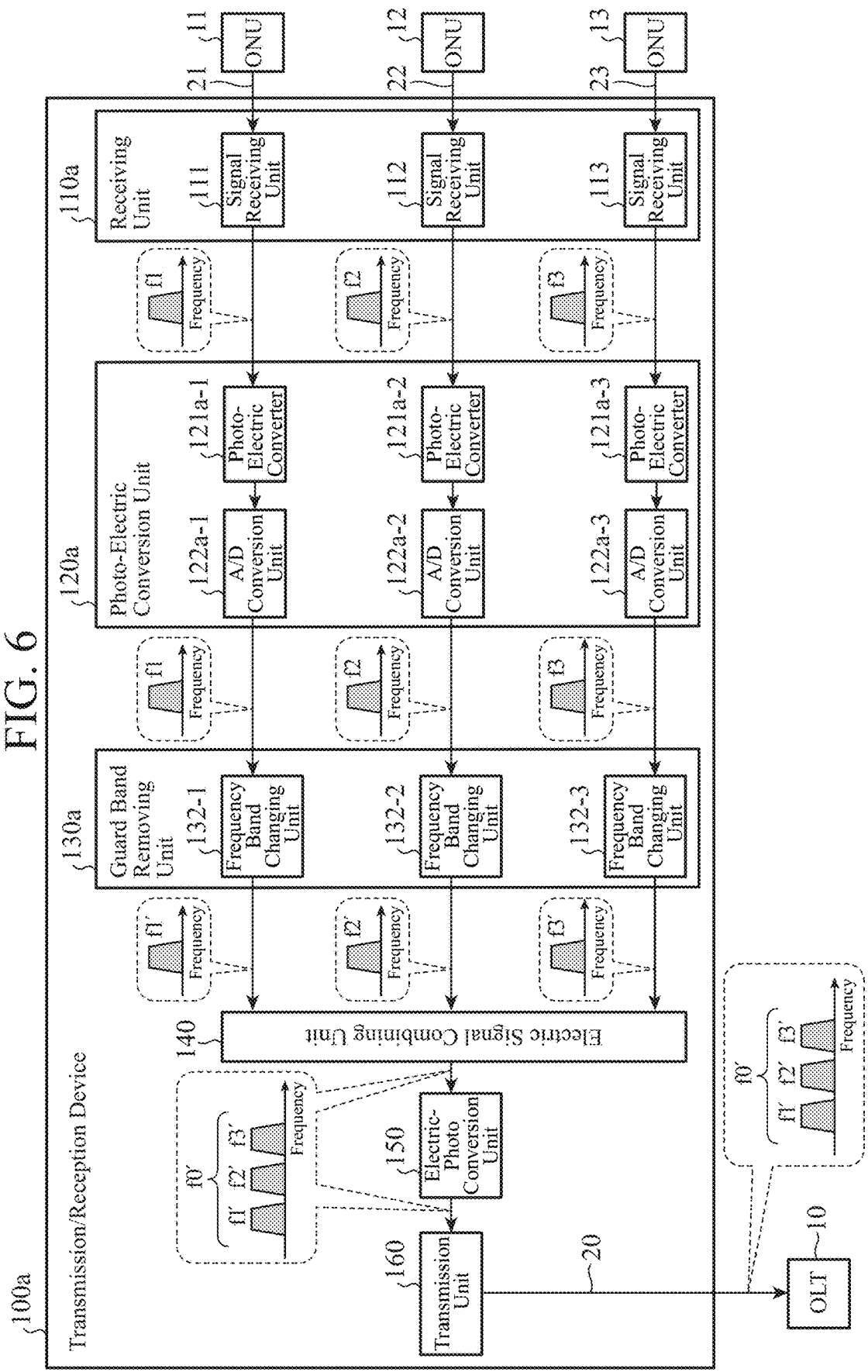
FIG. 6 is a diagram illustrating an example of a configuration of a main part of the transmission/reception device according to the second embodiment.

FIG. 6 is a diagram illustrating an example of the configuration of the main part of the transmission/reception device 100*a* according to the second embodiment.

The transmission/reception device 100*a* includes a receiving unit 110*a*, a photo-electric conversion unit 120*a*, a guard band removing unit 130*a*, an electric signal combining unit 140, an electric-photo conversion unit 150, and a transmission unit 160.

The configuration of the main part of the transmission/reception device 100*a* according to the second embodiment will be described with reference to FIG. 6. Note that, in FIG. 6, the same reference numerals are given to the same configurations as those illustrated in FIG. 2, and the description thereof will be omitted.

In the transmission/reception device 100*a*, the receiving unit 110, the photo-electric conversion unit 120, and the guard band removing unit 130 in the transmission/reception device 100 according to the first embodiment are changed to the receiving unit 110*a*, the photo-electric conversion unit 120*a*, and the guard band removing unit 130*a*, respectively. Therefore, description of the electric signal combining unit 140, the electric-photo conversion unit 150, and the transmission unit 160 included in the transmission/reception device 100*a* will be omitted.

The receiving unit 110*a* receives, as three first optical signals, optical signals having frequency bands different from each other, which are output from each of the three ONUs 11, 12, and 13, and outputs optical signals based on the received three first optical signals to the photo-electric conversion unit 120*a*.

Specifically, for example, as illustrated in FIG. 6, the receiving unit 110*a* according to the second embodiment includes three signal receiving units 111, 112, and 113 corresponding to the number of first optical signals received by the transmission/reception device 100*a*.

The three signal receiving units 111, 112, and 113 are connected to the other ends of the corresponding second optical communication paths 21, 22, and 23, respectively. The three signal receiving units 111, 112, and 113 are connected to the corresponding ONUs 11, 12, and 13 through the corresponding second optical communication paths 21, 22, and 23, respectively.

The three signal receiving units 111, 112, and 113 receive the optical signals output from the corresponding ONUs 11, 12, and 13 as first optical signals through the corresponding second optical communication paths 21, 22, and 23, respectively, and output the received first optical signals to the photo-electric conversion unit 120*a*.

That is, in the second embodiment, the optical signals based on the three first optical signals output from the receiving unit 110*a* are the three first optical signals output from the three signal receiving units 111, 112, and 113.

As illustrated in FIG. 6, each of the three first optical signals output from the three signal receiving units 111, 112, and 113 is an optical signal having any one of signals f1, f2, and f3 having frequency bands different from each other.

The photo-electric conversion unit 120*a* receives optical signals based on three first optical signals having frequency bands different from each other output from the receiving unit 110*a*, that is, three first optical signals, converts the three first optical signals into electric signals, and outputs the converted three electric signals to the guard band removing unit 130*a* as three first electric signals.

Specifically, for example, the photo-electric conversion unit 120*a* according to the second embodiment includes three photo-electric converters 121*a*-1, 121*a*-2, and 121*a*-3 and three A/D conversion units 122*a*-1, 122*a*-2, and 122*a*-3.

Each of the three photo-electric converters 121*a*-1, 121*a*-2, and 121*a*-3 receives one corresponding first optical signal among the three first optical signals output from the receiving unit 110*a*, converts the first optical signal into an analog electric signal, and outputs the converted analog electric signal to one corresponding A/D conversion unit 122*a*-*k* (k is a natural number from 1 to 3) among the three A/D conversion units 122*a*-1, 122*a*-2, and 122*a*-3.

Specifically, for example, each of the three photo-electric converters 121*a*-1, 121*a*-2, and 121*a*-3 includes a photodetector. Furthermore, for example, each of the three photo-electric converters 121*a*-1, 121*a*-2, and 121*a*-3 may include a photoelectric element of a coherent detection system.

Each of the three A/D conversion units 122*a*-1, 122*a*-2, and 122*a*-3 includes an A/D converter having an A/D conversion circuit and the like.

Each of the three A/D conversion units 122*a*-1, 122*a*-2, and 122*a*-3 receives an analog electric signal output from a corresponding one photo-electric converter 121*a*-*k* among the three photo-electric converters 121*a*-1, 121*a*-2, and 121*a*-3, converts the analog electric signal into a digital electric signal, and outputs the converted digital electric signal to the guard band removing unit 130*a* as a first electric signal.

As illustrated in FIG. 6, each of the three first electric signals output from the photo-electric conversion unit 120*a* is an electric signal having any frequency band among f1, f2, and f3 having frequency bands different from each other.

The guard band removing unit 130*a* receives three first electric signals output from the respective three A/D conversion units 122*a*-1, 122*a*-2, and 122*a*-3 and corresponding to the number of first optical signals received by the transmission/reception device 100*a*, and changes frequency bands of some or all of three second electric signals that are electric signals corresponding to the respective frequency bands of the three first optical signals based on the three first electric signals. The guard band removing unit 130*a* changes the frequency bands of some or all of the three second electric signals to narrow the interval between the frequency bands of the two second electric signals having frequency bands adjacent to each other. The guard band removing unit 130*a* outputs the electric signals corresponding to the three second electric signals after the interval is narrowed to the electric signal combining unit 140 as the three third electric signals.

Specifically, for example, the guard band removing unit 130*a* according to the second embodiment includes three frequency band changing units 132-1, 132-2, and 132-3 corresponding to the number of first optical signals received by the transmission/reception device 100*a*.

Each of the three frequency band changing units 132-1, 132-2, and 132-3 receives, as the second electric signal, one of the three first electric signals received by the guard band removing unit 130*a*. In the three frequency band changing units 132-1, 132-2, and 132-3, some or all of the three frequency band changing units 132-1, 132-2, and 132-3 change the frequency bands of the second electric signals received by the respective frequency band changing units 132-1, 132-2, and 132-3, thereby narrowing the interval between the frequency bands of the two second electric signals having frequency bands adjacent to each other. Each of the three frequency band changing units 132-1, 132-2, and 132-3 outputs an electric signal corresponding to the second electric signal after the interval is narrowed as the third electric signal.

That is, in the second embodiment, three second electric signals that are electric signals corresponding to respective frequency bands of three first optical signals based on the three first electric signals are three first electric signals.

The guard band removing unit 130*a* outputs the third electric signals output from the respective three frequency band changing units 132-1, 132-2, and 132-3 to the electric signal combining unit 140, thereby outputting the three third electric signals to the electric signal combining unit 140.

As illustrated in FIG. 6, each of the three third electric signals output from the guard band removing unit 130*a* is an electric signal having any one of frequency bands of f1', f2', and f3' having frequency bands different from each other.

The electric signal combining unit 140 receives the plurality of third electric signals output from the guard band removing unit 130*a*, combines the plurality of third electric signals, and outputs the combined electric signal to the electric-photo conversion unit 150 as a fourth electric signal.

The electric signal combining unit 140 illustrated in FIG. 6 receives three third electric signals output from the guard band removing unit 130*a* and having any one of signals f1', f2', and f3' having frequency bands different from each other, and combines the three third electric signals. Therefore, as illustrated in FIG. 2, the fourth electric signal output from the electric signal combining unit 140 is an electric signal including all signals with frequency bands of f1', f2', and f3' having frequency bands different from each other.

The electric-photo conversion unit 150 receives the fourth electric signal output from the electric signal combining unit 140, converts the fourth electric signal into an optical signal, and outputs the converted optical signal to the transmission unit 160 as a second optical signal.

As illustrated in FIG. 6, the second optical signal output from the electric-photo conversion unit 150 is an optical signal including all signals with frequency bands of f1', f2', and f3' having frequency bands different from each other.

A frequency range including all frequency bands f1', f2', and f3' having frequency bands different from each other in the second optical signal output from the electric-photo conversion unit 150 is defined as f0'.

The transmission unit 160 receives the second optical signal output from the electric-photo conversion unit 150, and transmits the second optical signal to the OLT 10 through the first optical communication path 20.

With the above configuration, the transmission/reception device 100*a* can compress some or all of the guard bands provided between the first optical signals by narrowing the interval between any first optical signals having frequency bands adjacent to each other among the first optical signals having frequency bands different from each other. By compressing some or all of the guard bands provided between the first optical signals, the transmission/reception device 100*a* can output, to the OLT 10, the second optical signal having the frequency range of f0' with the smaller frequency bandwidth as compared with the frequency range of the optical signal such as the third optical signal according to the first embodiment, for example, obtained by just multiplexing the three first optical signals received by the transmission/reception device 100*a*. Therefore, the transmission/reception device 100*a* can improve the frequency utilization efficiency of the frequency range used by the PON system 1*a*.

In addition, in the transmission/reception device 100*a* according to the second embodiment described above, the three signal receiving units 111, 112, and 113 in the receiving unit 110a, the three photo-electric converters 121a-1, 121a-2, and 121a-3 in the photo-electric conversion unit 120a, and the three frequency band changing units 132-1, 132-2, and 132-3 in the guard band removing unit 130a correspond to each other, respectively, but the present invention is not limited thereto.

For example, the transmission/reception device 100a may include a switch unit (not illustrated) between the receiving unit 110a and the photo-electric conversion unit 120a, and the switch unit may detect the respective frequency bands of the three first optical signals output from the receiving unit 110a, select the photo-electric converters 121a-1, 121a-2, and 121a-3 which are output destinations of the respective three first optical signals depending on the frequency bands of the respective detected three first optical signals, and output the three first optical signals.

Furthermore, for example, the transmission/reception device 100a may include a switch unit (not illustrated) between the photo-electric conversion unit 120a and the guard band removing unit 130a, and the switch unit may detect frequency bands of the respective three first electric signals output from the photo-electric conversion unit 120a, select the frequency band changing units 132-1, 132-2, and 132-3 which are output destinations of the respective three first electric signals depending on the frequency bands of the respective detected three first electric signals, and output the three first electric signals.

As described above, since the transmission/reception device 100a includes the switch unit between the receiving unit 110a and the photo-electric conversion unit 120a or between the photo-electric conversion unit 120a and the guard band removing unit 130a, the three signal receiving units 111, 112, and 113 in the receiving unit 110a do not need to receive the first optical signal having the predetermined frequency band. Specifically, the transmission/reception device 100a has more flexibility in connection between the three signal receiving units 111, 112, and 113 in the receiving unit 110a and the ONUs 11, 12, and 13.

As described above, the transmission/reception device 100a includes: the photo-electric conversion unit 120a to receive an optical signal based on a plurality of first optical signals having frequency bands different from each other, convert the optical signal into an electric signal, and output the converted electric signal as a plurality of first electric signals; the guard band removing unit 130a to receive a plurality of the first electric signals output from the photo-electric conversion unit 120a, change the frequency bands of some or all of a plurality of second electric signals that are electric signals corresponding to the respective frequency bands of a plurality of the first optical signals based on the plurality of the first electric signals to narrow an interval between the frequency bands of the two second electric signals having frequency bands adjacent to each other, and output electric signals, each of which corresponds to each of a plurality of the second electric signals after the interval has been narrowed, as a plurality of third electric signals; the electric signal combining unit 140 to receive a plurality of the third electric signals output from the guard band removing unit 130a, combine the plurality of the third electric signals, and output a combined electric signal as a fourth electric signal; and the electric-photo conversion unit 150 to receive the fourth electric signal output from the electric signal combining unit 140, convert the fourth electric signal into an optical signal, and output the converted optical signal as a second optical signal.

With this configuration, the transmission/reception device 100a can improve the frequency utilization efficiency of the frequency range used by the PON system 1a.

In addition, since the transmission/reception device 100a can improve the frequency utilization efficiency of the frequency range used by the PON system 1a, the PON system 1a using the transmission/reception device 100a as an intermediate node can reduce the number of intermediate nodes in the PON system 1a.

Further, in the above-described configuration, the transmission/reception device 100a is configured so that the photo-electric conversion unit 120a includes the A/D conversion units 122a-1, 122a-2, and 122a-3 capable of converting analog electric signals having the frequency bands corresponding to all of a plurality of first optical signals into a digital electric signal, the photo-electric conversion unit 120a outputs electric signals converted into the digital electric signals by the A/D conversion units 122a-1, 122a-2, and 122a-3 as a plurality of first electric signals, and the guard band removing unit 130a receives the plurality of first electric signals, which are all digital electric signals, and performs digital signal processing on the plurality of first electric signals to change the frequency bands of some or all of a plurality of second electric signals based on the plurality of first electric signals.

With this configuration, the transmission/reception device 100a can improve the frequency utilization efficiency of the frequency range used by the PON system 1a.

Further, in the above configuration, the transmission/reception device 100a is configured so that the second optical signal output from the electric-photo conversion unit 150 is an optical signal modulated by the WDM system.

With this configuration, the transmission/reception device 100a can improve the frequency utilization efficiency of the frequency range used by the PON system 1a.

Further, in the above configuration, the transmission/reception device 100a is configured so that the second optical signal output from the electric-photo conversion unit 150 is an optical signal modulated by the OFDM system.

With this configuration, the transmission/reception device 100a can improve the frequency utilization efficiency of the frequency range used by the PON system 1a.

Further, in the above-described configuration, the transmission/reception device 100a is configured so that the photo-electric conversion unit 120a converts optical signals based on the plurality of first optical signals into electric signals by photo-electric conversion by the intensity modulation and direct detection system.

With this configuration, the transmission/reception device 100a can improve the frequency utilization efficiency of the frequency range used by the PON system 1a.

Furthermore, in the above-described configuration, the transmission/reception device 100a is configured so that the photo-electric conversion unit 120a converts the optical signals based on the plurality of first optical signals into electric signals by photo-electric conversion by the coherent detection system.

With this configuration, the transmission/reception device 100a can improve the frequency utilization efficiency of the frequency range used by the PON system 1a.

Third Embodiment

A PON system 1b according to a third embodiment will be described with reference to FIG. 7.

Figure 7:
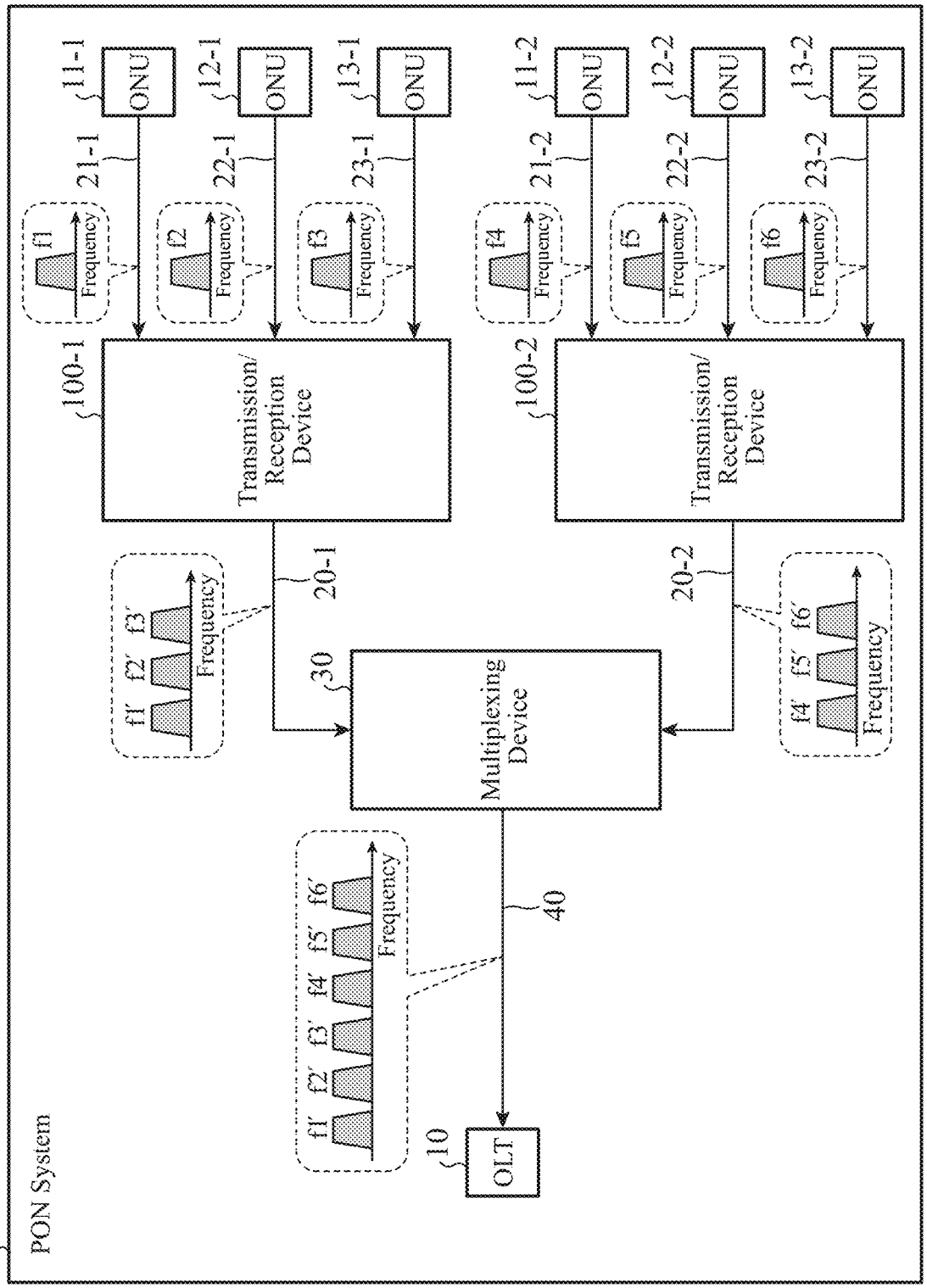
FIG. 7 is a block diagram illustrating an example of a configuration of a main part of a PON system according to a third embodiment.

FIG. 7 is a block diagram illustrating an example of a configuration of a main part of the PON system 1b according to the third embodiment.

The PON system 1b according to the third embodiment is obtained by applying the transmission/reception device 100 according to the first embodiment.

The PON system 1b includes an OLT 10, six ONUs 11-1, 12-1, 13-1, 11-2, 12-2, and 13-2, two transmission/reception devices 100-1 and 100-2 each of which is the transmission/reception device 100, a multiplexing device 30, one third optical communication path 40, two first optical communication paths 20-1 and 20-2 each of which is the first optical communication path 20, and six second optical communication paths 21-1, 22-1, 23-1, 21-2, 22-2, and 23-2 each of which is one of the second optical communication paths 21, 22, and 23.

A configuration of the PON system 1b according to the third embodiment will be described with reference to FIG. 7. Note that, in FIG. 7, the same reference numerals are given to the same configurations as those illustrated in FIG. 1, and the description thereof will be omitted.

The first optical communication path 20-1 is a communication path for transmitting an optical signal, including an optical fiber cable or the like having one end connected to the multiplexing device 30 and the other end connected to the transmission/reception device 100-1.

The first optical communication path 20-2 is a communication path for transmitting an optical signal, including an optical fiber cable or the like having one end connected to the multiplexing device 30 and the other end connected to the transmission/reception device 100-2.

The second optical communication paths 21-1, 22-1, and 23-1 are communication paths for transmitting optical signals, including optical fiber cables or the like having one ends connected to the corresponding three ONUs 11-1, 12-1, and 13-1 respectively and the other ends connected to the transmission/reception device 100-1.

The second optical communication paths 21-2, 22-2, and 23-2 are communication paths for transmitting optical signals, including optical fiber cables or the like having one ends connected to the corresponding three ONUs 11-2, 12-2, respectively and 13-2 and the other ends connected to the transmission/reception device 100-2.

The third optical communication path 40 is a communication path for transmitting an optical signal, including an optical fiber cable or the like having one end connected to the OLT 10 and the other end connected to the multiplexing device 30.

The transmission/reception device 100-1 receives, through the second optical communication paths 21-1, 22-1, and 23-1, first optical signals output from each of the three ONUs 11-1, 12-1, and 13-1, and having frequency bands different from each other. For example, as illustrated in FIG. 7, the transmission/reception device 100-1 receives the first optical signals output from each of the three ONUs 11-1, 12-1, and 13-1 and having frequency bands of any of f1, f2, or f3. Note that, it is assumed that f1, f2, and f3 satisfy f1<f2<f3 as an example.

The transmission/reception device 100-1 combines signals based on the received three first optical signals, and transmits an optical signal based on the combined signal as a second optical signal to the multiplexing device 30 through the first optical communication path 20-1. More specifically, the transmission/reception device 100-1 transmits the second optical signal obtained by compressing some or all of the guard bands provided between the first optical signals to the multiplexing device 30 by narrowing the interval between any first optical signals having frequency bands adjacent to each other among the first optical signals having frequency bands different from each other.

The second optical signal transmitted from the transmission/reception device 100-1 to the multiplexing device 30 is an optical signal having signals with the frequency bands of f1', f2', and f3'.

The transmission/reception device 100-2 receives, through the second optical communication paths 21-2, 22-2, and 23-2, first optical signals output from each of the three ONUs 11-2, 12-2, and 13-2, and having frequency bands different from each other. For example, as illustrated in FIG. 7, the transmission/reception device 100-2 receives the first optical signals output from each of the three ONUs 11-2, 12-2, and 13-2 and having frequency bands of f4, f5, or f6. Note that, it is assumed that f4, f5, and f6 satisfy f4<f5<f6 as an example.

The transmission/reception device 100-2 combines signals based on the received three first optical signals, and transmits an optical signal based on the combined signal as a second optical signal to the multiplexing device 30 through the first optical communication path 20-2. More specifically, the transmission/reception device 100-2 transmits the second optical signal obtained by compressing some or all of the guard bands provided between the first optical signals to the multiplexing device 30 by narrowing the interval between any first optical signals having frequency bands adjacent to each other among the first optical signals having frequency bands different from each other.

The second optical signal transmitted from the transmission/reception device 100-2 to the multiplexing device 30 is an optical signal having signals with the frequency bands of f4', f5', and f6'.

Note that, in the third embodiment, it is assumed that the second optical signal output from the transmission/reception device 100-1 and the second optical signal output from the transmission/reception device 100-2 are optical signals having frequency bands different from each other.

More specifically, f1', f2', and f3', which are frequency bands of the second optical signal transmitted from the transmission/reception device 100-1 to the multiplexing device 30, and f4', f5', and f6', which are frequency bands of the second optical signal transmitted from the transmission/reception device 100-2 to the multiplexing device 30, are frequency bands different from each other. Note that, it is assumed that f1', f2', f3', f4', f5', and f6' satisfy f1'<f2'<f3'<f4'<f5'<f6' as an example.

The multiplexing device 30 receives the second optical signal output from the transmission/reception device 100-1 and the second optical signal output from the transmission/reception device 100-2, multiplexes the two second optical signals, and outputs the multiplexed optical signal to the OLT 10 through the third optical communication path 40.

The optical signal output from the multiplexing device 30 to the OLT 10 is an optical signal having signals with frequency bands of f1', f2', f3', f4', f5', and f6'.

By configuring the PON system 1b as described above, the transmission/reception device 100 can improve the frequency utilization efficiency of the frequency range used by the PON system 1b.

Note that the PON system 1b according to the third embodiment has been described as including the two transmission/reception devices 100-1 and 100-2 that are both the transmission/reception devices 100 according to the first embodiment. However, the number of transmission/reception devices 100 included in the PON system 1b is not limited to two, and the PON system 1b may include equal to or more than three transmission/reception devices 100.

In addition, the PON system 1b according to the third embodiment has been described as including the two transmission/reception devices 100-1 and 100-2 that are both the transmission/reception devices 100 according to the first embodiment. However, the PON system 1b according to the third embodiment may replace some or all of the transmission/reception devices 100 with the transmission/reception devices 100a according to the second embodiment.

Fourth Embodiment

A PON system 1c according to a fourth embodiment will be described with reference to FIG. 8.

Figure 8:
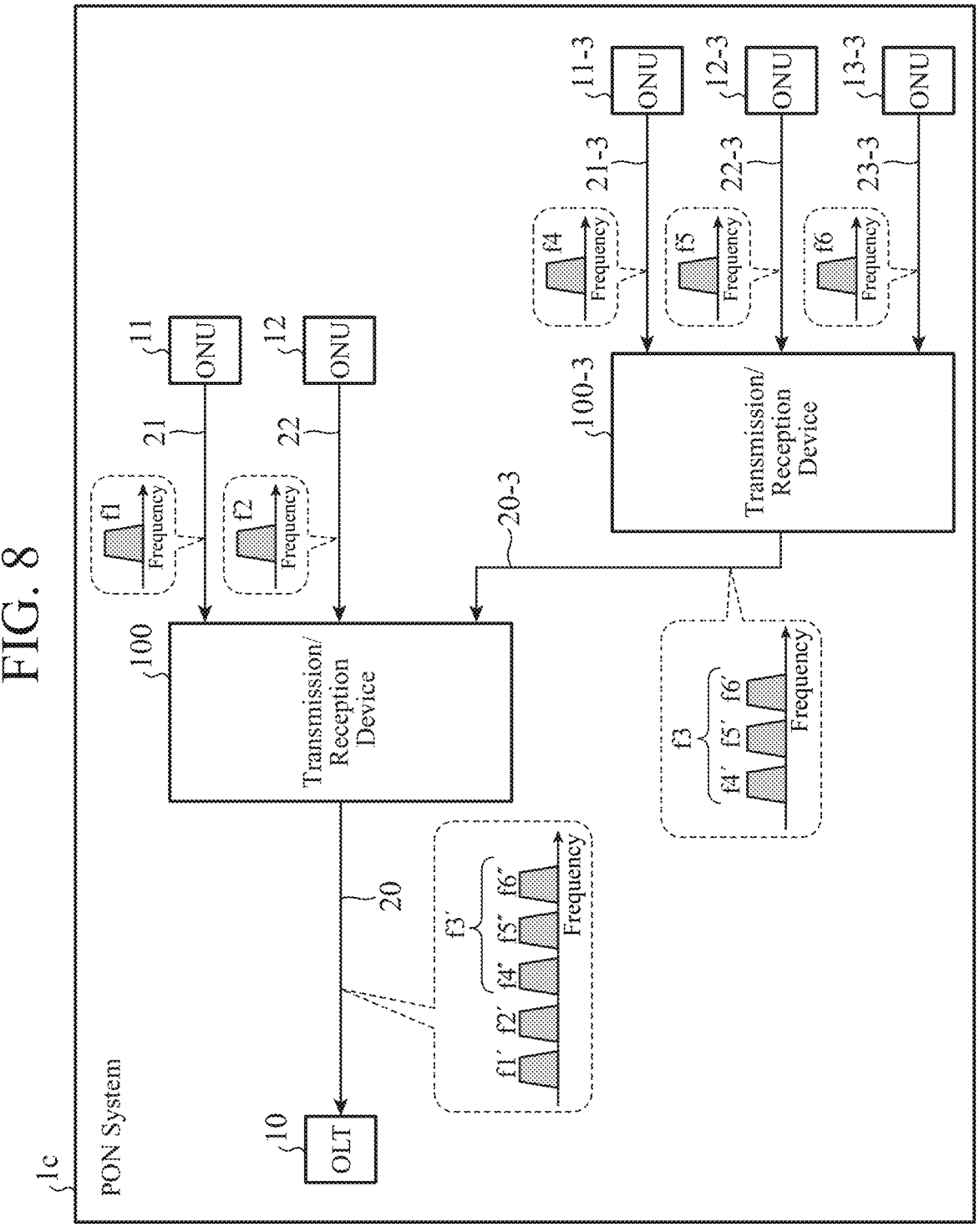
FIG. 8 is a block diagram illustrating an example of a configuration of a main part of a PON system according to a fourth embodiment.

FIG. 8 is a diagram illustrating an example of a configuration of a main part of the PON system 1c according to the fourth embodiment.

The PON system 1c according to the fourth embodiment is obtained by applying the transmission/reception device 100 according to the first embodiment.

The PON system 1c includes an OLT 10, five ONUs 11, 12, 11-3, 12-3, and 13-3, two transmission/reception devices 100 and 100-3 each of which is the transmission/reception device 100, two first optical communication paths 20 and 20-3 each of which is the first optical communication path 20, and five second optical communication paths 21, 22, 21-3, 22-3, and 23-3 each of which is any of the second optical communication paths 21, 22, and 23.

In the PON system 1c, the ONU 13 and the second optical communication path 23 of the PON system 1 according to the first embodiment illustrated in FIG. 1 are changed to a transmission/reception device 100-3, ONUs 11-3, 12-3, and 13-3, second optical communication paths 21-3, 22-3, and 23-3, and a first optical communication path 20-3.

A configuration of the PON system 1c according to the fourth embodiment will be described with reference to FIG. 8. Note that, in FIG. 8, the same reference numerals are given to the same configurations as those illustrated in FIG. 1, and the description thereof will be omitted.

The first optical communication path 20-3 is a communication path for transmitting an optical signal, including an optical fiber cable or the like having one end connected to the transmission/reception device 100 and the other end connected to the transmission/reception device 100-3.

The second optical communication paths 21-3, 22-3, and 23-3 are communication paths for transmitting optical signals, including optical fiber cables or the like having one ends connected to the corresponding three ONUs 11-3, 12-3, and 13-3 and the other ends connected to the transmission/reception device 100-3.

The transmission/reception device 100-3 receives, through the second optical communication paths 21-3, 22-3, and 23-3, first optical signals output from each of the three ONUs 11-3, 12-3, and 13-3, and having frequency bands different from each other. For example, as illustrated in FIG. 8, the transmission/reception device 100-3 receives the first optical signals output from each of the three ONUs 11-3, 12-3, and 13-3 and having frequency bands of f4, f5, or f6. Note that, it is assumed that f4, f5, and f6 satisfy f4<f5<f6 as an example.

The transmission/reception device 100-3 combines signals based on the received three first optical signals, and transmits an optical signal based on the combined signal as a second optical signal to the transmission/reception device 100 through the first optical communication path 20-3. More specifically, the transmission/reception device 100-3 transmits, to the transmission/reception device 100, the second optical signal obtained by compressing some or all of the guard bands provided between the first optical signals by narrowing the interval between any first optical signals having frequency bands adjacent to each other among the first optical signals having frequency bands different from each other.

The second optical signal transmitted from the transmission/reception device 100-3 to the transmission/reception device 100 is an optical signal having signals with the frequency bands of f4', f5', and f6'. Hereinafter, a description will be given assuming that the frequency bands of f4', f5', and f6' are combined to constitute a frequency band of f3.

The transmission/reception device 100 receives, through the second optical communication paths 21 and 22, first optical signals having frequency bands different from each other output from each of the two ONUs 11 and 12. Further, the transmission/reception device 100 receives the second optical signal output from the transmission/reception device 100-3 as the first optical signal.

For example, as illustrated in FIG. 8, first optical signals output from each of the two ONUs 11 and 12 and having frequency bands of any of f1 or f2, and a first optical signal output from the transmission/reception device 100-3 and having a frequency band of f3 are received. Note that, it is assumed that f3, which is the frequency band of the first optical signal output from the transmission/reception device 100-3, is a frequency band different from both f1 and f2, which are the frequency bands of the first optical signals output from the two ONUs 11 and 12. As an example, it is assumed that f1, f2, and f3 satisfy f1<f2<f3.

The transmission/reception device 100 combines signals based on the received three first optical signals, and transmits an optical signal based on the combined signal as a second optical signal to the OLT 10 through the first optical communication path 20. More specifically, the transmission/reception device 100 transmits, to the OLT 10, the second optical signal obtained by compressing some or all of the guard bands provided between the first optical signals by narrowing an interval between any first optical signals having frequency bands adjacent to each other among the first optical signals having frequency bands different from each other.

The second optical signal transmitted from the transmission/reception device 100 to the OLT 10 is an optical signal having signals with the frequency bands of f1', f2', and f3'. That is, as illustrated in FIG. 8, the second optical signal transmitted from the transmission/reception device 100 to the OLT 10 is an optical signal having signals with frequency bands of f1', f2', f4", f5", and f6". Note that f1', f2', f4", f5", and f6" satisfy, for example, f1'<f2'<f4"<f5"<f6".

By configuring the PON system 1c as described above, the transmission/reception device 100 can improve the frequency utilization efficiency of the frequency range used by the PON system 1c.

Note that the PON system 1c according to the fourth embodiment has been described as including the two transmission/reception devices 100 and 100-3 that are both the transmission/reception devices 100 according to the first embodiment. However, the PON system 1c according to the fourth embodiment may replace some or all of the transmission/reception devices 100 with the transmission/reception devices 100a according to the second embodiment.

In addition, the transmission/reception device 100 in the PON system 1c according to the fourth embodiment receives one first optical signal among the plurality of first optical signals received by the transmission/reception device 100 and the second optical signal output by the transmission/reception device 100-3, but the present invention is not limited thereto. For example, the transmission/reception device 100 in the PON system 1c according to the fourth embodiment may receive the second optical signal output from each of the plurality of transmission/reception devices 100-3 (not illustrated) as the plurality of first optical signals. Furthermore, for example, the transmission/reception device 100 in the PON system 1c according to the fourth embodiment may receive, as the first optical signal, the second optical signal output from each of the plurality of transmission/reception devices 100-3 (not illustrated) in all the first optical signals among the plurality of first optical signals received by the transmission/reception device 100.

It should be noted that the present invention can freely combine the embodiments, modify any constituent element of each embodiment, or omit any constituent element in each embodiment within the scope of the invention.

INDUSTRIAL APPLICABILITY

The transmission/reception device according to the present invention can be applied to an intermediate node of a PON system.

REFERENCE SIGNS LIST

1, 1a, 1b, 1c: PON system, 10: OLT, 11, 12, 13, 11-1, 12-1, 13-1, 11-2, 12-2, 13-2, 11-3, 12-3, 13-3: ONU, 20, 20-1, 20-2, 20-3: first optical communication path, 21, 22, 22, 21-1, 22-1, 23-1, 21-2, 22-2, 23-2, 21-3, 22-3, 23-3: second optical communication path, 30: multiplexing device, 40: third optical communication path, 100, 100a, 100-1, 100-2, 100-3: transmission/reception device, 110, 110a: receiving unit, 111, 112, 113: signal receiving unit, 114: optical signal multiplexing unit, 120, 120a: photo-electric conversion unit, 121, 121a-1, 121a-2, 121a-3: photo-electric converter, 122, 122a-1, 122a-2, 122a-3: A/D conversion unit, 123: fan-out unit, 130, 130a: guard band removing unit, 131-1, 131-2, 131-3: bandpass filter, 132-1, 132-2, 132-3: frequency band changing unit, 133-1, ..., 133-n, ..., 133-47: flip-flop, 134-1, ..., 134-n, ..., 134-47: complex multiplying unit, 135-1, ..., 135-n, ..., 135-47: digital filter, 136: sum calculation unit, 137: branch unit, 138-1, 138-2: multiplication unit, 139: addition unit, 140: electric signal combining unit, 150: electric-photo conversion unit, 160: transmission unit, 170: NCO

The invention claimed is:

1. A transmission/reception device comprising:
a photo-electric converter to receive an optical signal based on a plurality of first optical signals having frequency bands different from each other, convert the optical signal into an electric signal, and output the converted electric signal as a plurality of first electric signals;
a guard band remover to receive the plurality of the first electric signals output from the photo-electric converter, change the frequency bands of some or all of a plurality of second electric signals that are electric signals corresponding to the respective frequency bands of the plurality of first optical signals based on the plurality of first electric signals to narrow an interval between the frequency bands of the two second electric signals having frequency bands adjacent to each other, and output electric signals each of which corresponds to each of the plurality of second electric signals after the interval has been narrowed, as a plurality of third electric signals;
an electric signal combiner to receive the plurality of third electric signals output from the guard band remover, combine the plurality of third electric signals, and output a combined electric signal as a fourth electric signal; and
an electric-photo converter to receive the fourth electric signal output from the electric signal combiner, convert the fourth electric signal into an optical signal, and output the converted optical signal as a second optical signal.

2. The transmission/reception device according to claim 1, wherein
the photo-electric converter includes an A/D converter configured to convert an analog electric signal having the frequency bands corresponding to all of the plurality of first optical signals into a digital electric signal,
the photo-electric converter outputs an electric signal converted into the digital electric signal by the A/D converter as the plurality of first electric signals, and
the guard band remover receives the plurality of first electric signals, which are all digital electric signals, and performs digital signal processing on the plurality of first electric signals to change the frequency bands of some or all of the plurality of second electric signals based on the plurality of first electric signals.

3. The transmission/reception device according to claim 1, wherein
the second optical signal output from the electric-photo converter is an optical signal modulated by a WDM system.

4. The transmission/reception device according to claim 1, wherein
the second optical signal output from the electric-photo converter is an optical signal modulated by an OFDM system.

5. The transmission/reception device according to claim 1, wherein
the photo-electric converter converts an optical signal based on the plurality of first optical signals into an electric signal by photo-electric conversion by an intensity modulation and direct detection system.

6. The transmission/reception device according to claim 1, wherein
the photo-electric converter converts an optical signal based on the plurality of first optical signals into an electric signal by photo-electric conversion using a coherent detection system.

7. The transmission/reception device according to claim 1, further comprising
an optical signal multiplexer to receive the plurality of first optical signals, multiplex the plurality of first optical signals, and output a multiplexed optical signal as a third optical signal, wherein
the photo-electric converter receives the third optical signal output from the optical signal multiplexer as an optical signal based on the plurality of first optical signals,
the photo-electric converter includes a fan-out unit,
the fan-out unit receives an electric signal after the third optical signal is converted into an electric signal by the photo-electric converter, divides the electric signal into a plurality of electric signals, and outputs the plurality of electric signals, the photo-electric outputs the plurality of electric signals output from the fan-out unit as the plurality of first electric signals, the guard band remover includes a plurality of bandpass filters, each of the plurality of bandpass filters receives one of the plurality of first electric signals received by the guard band remover, cuts out an electric signal having the corresponding frequency band among the respective frequency bands of the plurality of first optical signals from the first electric signal, and outputs the cut-out electric signal as the second electric signal, and the guard band remover changes the frequency bands of some or all of the second electric signals output from each of the plurality of bandpass filters to narrow an interval between the frequency bands of the two second electric signals having frequency bands adjacent to each other, and outputs electric signals corresponding to each of the plurality of second electric signals after the interval has been narrowed as the plurality of third electric signals.

8. A transmission/reception method, comprising:

receiving an optical signal based on a plurality of first optical signals having frequency bands different from each other, converting the optical signal into an electric signal, and outputting the converted electric signal as a plurality of first electric signals;

receiving the plurality of first electric signals output in the photo-electric conversion step, changing the frequency bands of some or all of a plurality of second electric signals that are electric signals corresponding to the respective frequency bands of the plurality of first optical signals based on the plurality of first electric signals to narrow an interval between the frequency bands of the two second electric signals having frequency bands adjacent to each other, and outputting electric signals each of which corresponds to the plurality of second electric signals after the interval has been narrowed as a plurality of third electric signals;

receiving the plurality of third electric signals output in the guard band removing step, combining the plurality of third electric signals, and outputting a combined electric signal as a fourth electric signal; and receiving the fourth electric signal output in the electric signal combining step, converting the fourth electric signal into an optical signal, and outputting the converted optical signal as a second optical signal.

* * * * *